United States Patent
Putnam

(10) Patent No.: US 6,409,202 B1
(45) Date of Patent: Jun. 25, 2002

(54) UNDERBED GOOSENECK

(76) Inventor: Rex D. Putnam, 239 Sherman St., Bronson, MI (US) 49028

( * ) Notice: Subject to any disclaimer, the term of this patent is extended or adjusted under 35 U.S.C. 154(b) by 37 days.

(21) Appl. No.: 09/703,067

(22) Filed: Oct. 31, 2000

(51) Int. Cl.[7] .............................................. B60D 13/00
(52) U.S. Cl. ..................................................... 280/495
(58) Field of Search ........................... 280/901, 491.1, 280/491.5, 495, 511, 483, 484, 485, 486, 487, 488, 489

(56) References Cited

U.S. PATENT DOCUMENTS

| | | | |
|---|---|---|---|
| 4,256,324 A | | 3/1981 | Hamilton |
| 4,540,194 A | | 9/1985 | Dane |
| 4,546,994 A | | 10/1985 | Taylor |
| 4,570,966 A | | 2/1986 | Giboney et al. |
| 4,657,274 A | | 4/1987 | Mann et al. |
| 5,016,898 A | * | 5/1991 | Works et al. ................ 280/433 |
| 5,058,915 A | * | 10/1991 | Burns ....................... 280/441.2 |
| 5,104,138 A | | 4/1992 | Allen |
| 5,143,393 A | | 9/1992 | Meyer |
| 5,246,244 A | | 9/1993 | Colibert |
| 5,344,172 A | | 9/1994 | Jaun |
| 5,472,222 A | | 12/1995 | Marcy |
| 5,571,270 A | * | 11/1996 | Larkin ..................... 280/417.1 |
| 5,577,751 A | | 11/1996 | Matthews |
| 5,755,452 A | * | 5/1998 | Tambornino ............. 280/415.1 |
| 6,024,373 A | * | 2/2000 | Wallace ...................... 280/457 |
| 6,095,545 A | * | 8/2000 | Bol et al. ................. 280/491.1 |
| 6,099,015 A | * | 8/2000 | Marcy ........................ 280/433 |
| 6,158,761 A | * | 12/2000 | King .......................... 280/495 |

FOREIGN PATENT DOCUMENTS

DE        3328524 A1 *  2/1985  ............ B60D/1/06

* cited by examiner

Primary Examiner—Lanna Mai
Assistant Examiner—Paul Royal, Jr.
(74) Attorney, Agent, or Firm—Mary M. Moyne; Ian C. McLeod

(57) ABSTRACT

A hitch assembly (10) for mounting adjacent an underneath surface (102A) of a bed (102) of a truck (100) to enable the truck to tow a vehicle having a gooseneck coupling. The hitch assembly has a retractable hitch ball (28, 228) which allows for retracting the hitch ball out of the bed of the truck when not in use. The hitch assembly includes a mounting assembly, a container (24) and a hitch ball. The container is mounted in an opening (14E) of a mounting plate (14) of the mounting assembly such that the open top end of the container is adjacent an opening in the bed of the truck. The hitch ball is positioned in the container with a compression spring (29) located between the hitch ball and the closed, lower end (24B) of the container. The compression spring acts to move the hitch ball into the semi-retracted position when the locking mechanism (34) is unlocked. When the hitch ball is moved to the fully extended or fully retracted position, the locking mechanism automatically locks the hitch ball in position.

27 Claims, 7 Drawing Sheets

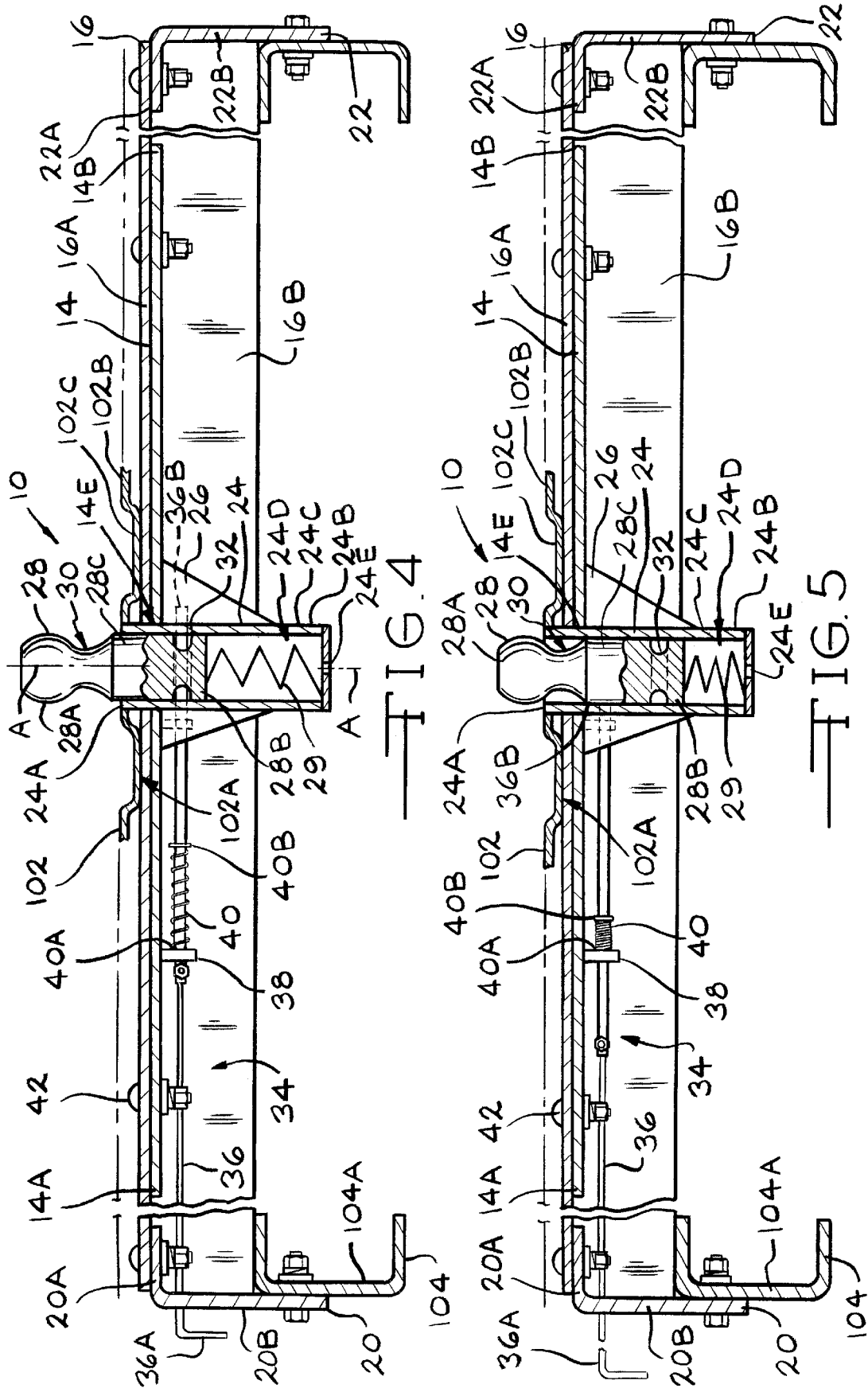

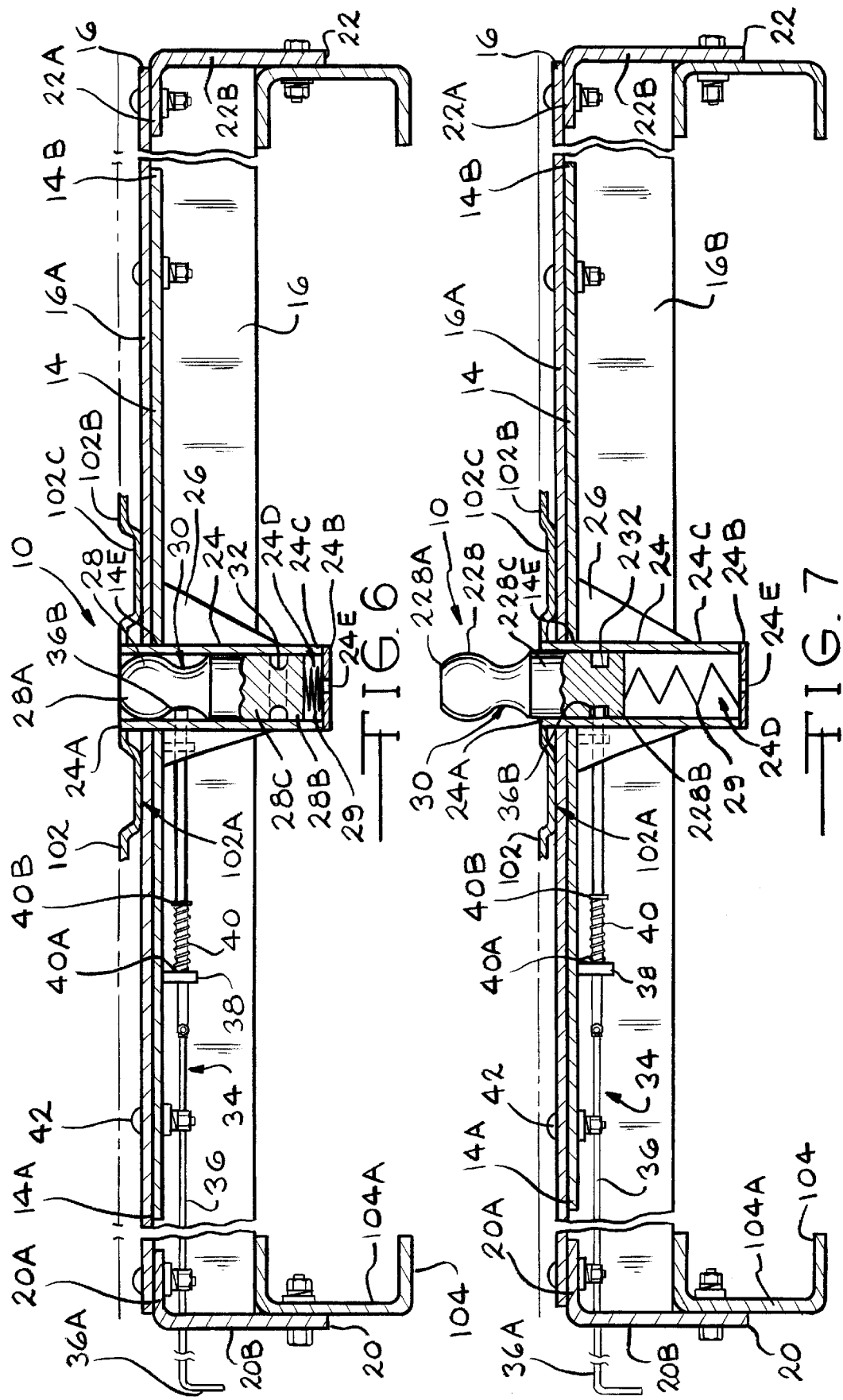

UNDERBED GOOSENECK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a hitch assembly having a retractable hitch ball for use in the bed of a truck for towing a gooseneck trailer. In particular, the present invention relates to a hitch assembly which is mounted underneath the bed of a truck and which has a container within which the hitch ball is retracted when not in use.

(2) Description of the Related Art

The related art has shown various hitch assemblies for mounting adjacent an underneath surface of the bed of a truck which have a hitch ball which extends through an opening in the bed of the truck when in use and which can be retracted from the bed of the truck when not needed. Illustrative are U.S. Pat. No. 4,256,324 to Hamilton; U.S. Pat. No. 4,540,194 to Dane; U.S. Pat. No. 4,570,966 to Giboney et al and U.S. Pat. No. 4,657,274 to Mann et al.

Hamilton and Dane describe hitch assemblies having hitch balls that pivot into a retracted position into an opening in the bed of the truck. When the hitch ball is not in use, the side of the hitch ball and a pivotable plate cover the opening in the bed of the truck when the hitch ball is retracted.

Giboney et al describes a retractable trailer hitch ball which is mounted beneath the bed of a vehicle. The hitch ball is extendable through an opening in the bed of the vehicle by operation of a hydraulic cylinder. The hitch ball is mounted on a pivotable plate which has a spring which moves the plate and the hitch ball away from the bed of the truck when the hitch ball is not needed and the hydraulic cylinder is retracted.

Mann et al describes a retractable king pin assembly for mounting in the bed of a vehicle. The king pin has a vertical rack and is elevated and retracted by means of a spur gear engaging the teeth of the rack. Mann et al also has a bolt which extends through a bore in the housing and a hole in the king pin to lock the king pin in the extended position. The bolt has a spring which urges the bolt into the locked position.

U.S. Pat. No. 4,546,994 to Taylor; U.S. Pat. No. 5,104,138 to Allen; U.S. Pat. No. 5,143,393 to Meyer; U.S. Pat. No. 5,246,244 to Colibert; U.S. Pat. No. 5,344,172 to Jaun; U.S. Pat. No. 5,472,222 to Marcy and U.S. Pat. No. 5,577,751 to Matthews show hitch assemblies for mounting underneath the bed of a truck where the hitch ball or other receiver is removable from the hitch assemblies when not in use.

In addition, Matthews and Marcy show a locking means for holding the hitch ball in place. In Marcy, a locking pin extends into a vertical groove in the hitch ball to lock the hitch ball in the extended position. In Matthews, a locking rod extends through the receiving means and through the hitch ball to removably couple the hitch ball to the receiving means.

Also of interest is U.S. Pat. No. 5,016,898 to Works et al which describes a hitch assembly where the hitch ball is removed from the sleeve member and reinserted upside down in the retention sleeve member for storage. The sleeve member and base portion of the hitch ball include a pair of side openings therethrough to allow for a locking pin assembly to extend through the hitch ball to lock the hitch ball in the retention sleeve member in the extended position and above the bottom of the hitch ball to lock the hitch ball in the storage position.

There remains the need for a hitch assembly for a bed of a truck where the hitch ball is stored in a container beneath the bed of the truck when not in use, and where the hitch ball automatically moves into a semi-retracted position to allow for a single user to quickly and easily move the hitch ball to the extended position prior to use.

SUMMARY OF THE INVENTION

The hitch assembly of the present invention is intended to be mounted beneath the bed of a truck such that in the fully extended position, the hitch ball extends through an opening in the bed of the truck. The hitch ball allows the truck to be used to tow a vehicle having a gooseneck with a hitch ball coupling which mounts on the hitch ball. The hitch assembly includes a container which mounts adjacent the underneath surface of the bed of the truck adjacent the opening in the bed of the truck. A compression spring is located in the container between the closed, second end of the container and the second end of the hitch ball. The compression spring moves the hitch ball from the fully retracted position to the semi-retracted position. The hitch assembly also includes a locking mechanism which locks the hitch ball in the fully extended position during use and in the fully retracted position during non-use or storage. The force of the compression spring is such that when the locking mechanism is unlocked while the hitch ball is fully extended, the weight of the hitch ball compresses the compression spring and moves the hitch ball into the semi-retracted position. In the semi-retracted position, the hitch ball extends above the bed of the truck, enabling the user to grasp the hitch ball and pull the hitch ball into the fully extended position or push down on the hitch ball to move the hitch ball into the fully retracted position. The locking rod of the locking mechanism is provided with a compression spring which automatically moves the locking rod to the locked position when the user pulls or pushes the hitch ball into the fully retracted or fully extended position. The ability to easily retract the hitch ball into the container of the hitch assembly eliminates the need to remove the hitch assembly or the hitch ball when the hitch ball is no longer needed. Consequently, the present invention allows a truck to be easily and quickly converted from a standard truck to a towing vehicle for a gooseneck trailer. The use of the automatic locking mechanism and the compression spring adjacent the hitch ball allows the truck to be easily and quickly converted to a gooseneck towing vehicle by a single use.

The present invention relates to a trailer hitch assembly for a bed of a truck adjacent an opening in the bed of the truck, which comprises: a container having a first end and a closed, second end with a sidewall extending therebetween forming an inner chamber, the sidewall having an opening extending into the inner chamber wherein the container is mounted adjacent an underneath surface of the bed of the truck such that the first end of the container is adjacent the opening in the bed of the truck; a hitch ball mounted in the inner chamber of the container having a first ball end and a second end; a biasing means mounted in the inner chamber of the container between the closed, second end of the container and the second end of the hitch ball for biasing the hitch ball toward the open first end of the container; and a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position.

Further, the present invention relates to a trailer hitch assembly for mounting on an underneath surface of a bed of a truck adjacent an opening in the bed of the truck, which comprises: a mounting plate for mounting adjacent the underneath surface of the bed of the truck, the plate having an opening wherein when the mounting plate is mounted adjacent the underneath surface of the bed, the opening of the mounting plate is adjacent the opening in the bed of the truck; a container mounted in the opening of the mounting plate and having a first end and a closed, second end with a sidewall extending therebetween forming an inner chamber, the sidewall having an opening extending into the inner chamber wherein the container is mounted such that the first end of the container is adjacent the opening in the bed of the truck; a hitch ball mounted in the inner chamber of the container having a first ball end and a second end; a biasing means mounted in the inner chamber of the container between the closed, second end of the container and the second end of the hitch ball for biasing the hitch ball toward the open first end of the container; and a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position.

Still further, the present invention relates to a method for providing a retractable hitch ball in a bed of a truck, which comprises: mounting a hitch ball assembly to an underneath side of the bed of the truck adjacent an opening in the bed of the truck, the hitch ball assembly including: a container having a first end and a closed second end with a sidewall extending therebetween forming an inner chamber, the sidewall having an opening extending into the inner chamber wherein the container is mounted adjacent the underneath surface of the bed of the truck such that the first end of the container is adjacent the opening in the bed of the truck; a hitch ball mounted in the inner chamber of the container having a first ball end and a second end; a biasing means mounted in the inner chamber of the container between the closed, second end of the container and the second end of the hitch ball for biasing the hitch ball toward the open first end of the container; and a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position; positioning the hitch ball in a locked, retracted position such that the first end of the hitch ball does not extend beyond the first end of the container in a direction opposite the second end of the container and the locking rod is in the locked position such that the first end of the locking rod is in contact with the hitch ball; moving the locking rod into the unlocked position by applying a force to the second end of the locking rod in a direction opposite the first end of the locking rod wherein when the locking rod moves out of contact with the hitch ball, the biasing means moves the hitch ball into a semi-extended position; releasing the locking rod; and applying a force to the hitch ball in a direction away from the second end of the container such that the hitch ball moves into the fully extended position wherein as the hitch ball moves into the fully extended position, the first end of the locking rod moves into a locked position to lock the hitch ball in the fully extended position.

The substance and advantages of the present invention will become increasingly apparent by reference to the following drawings and the description.

BRIEF DESCRIPTION OF THE DRAWINGS

FIG. 4 is a cross-sectional view of the hitch assembly 10 of a first embodiment mounted beneath the bed 102 of the truck 100 showing the locking rod 36 in the locked position extending along the notch 32 in the body 28C of the hitch ball 28.

FIG. 5 is a cross-sectional view of the hitch assembly 10 mounted beneath the bed 102 of the truck 100 showing the hitch ball 28 in the semi-retracted position with the locking rod 36 in the unlocked position.

FIG. 6 is a cross-sectional view of the hitch assembly 10 mounted beneath the bed 102 of the truck 100 showing the hitch ball 28 in the fully retracted position with the locking rod 36 in the locked position.

FIG. 7 is a cross-sectional view of the hitch assembly 10 mounted beneath the bed 102 of the truck 100 showing the alternate hitch ball 228 in the fully extended position with the locking rod 36 in the locked position extending through the locking bore 232 in the body 228C of the hitch ball 228.

DESCRIPTION OF THE PREFERRED EMBODIMENTS

Figure 2:
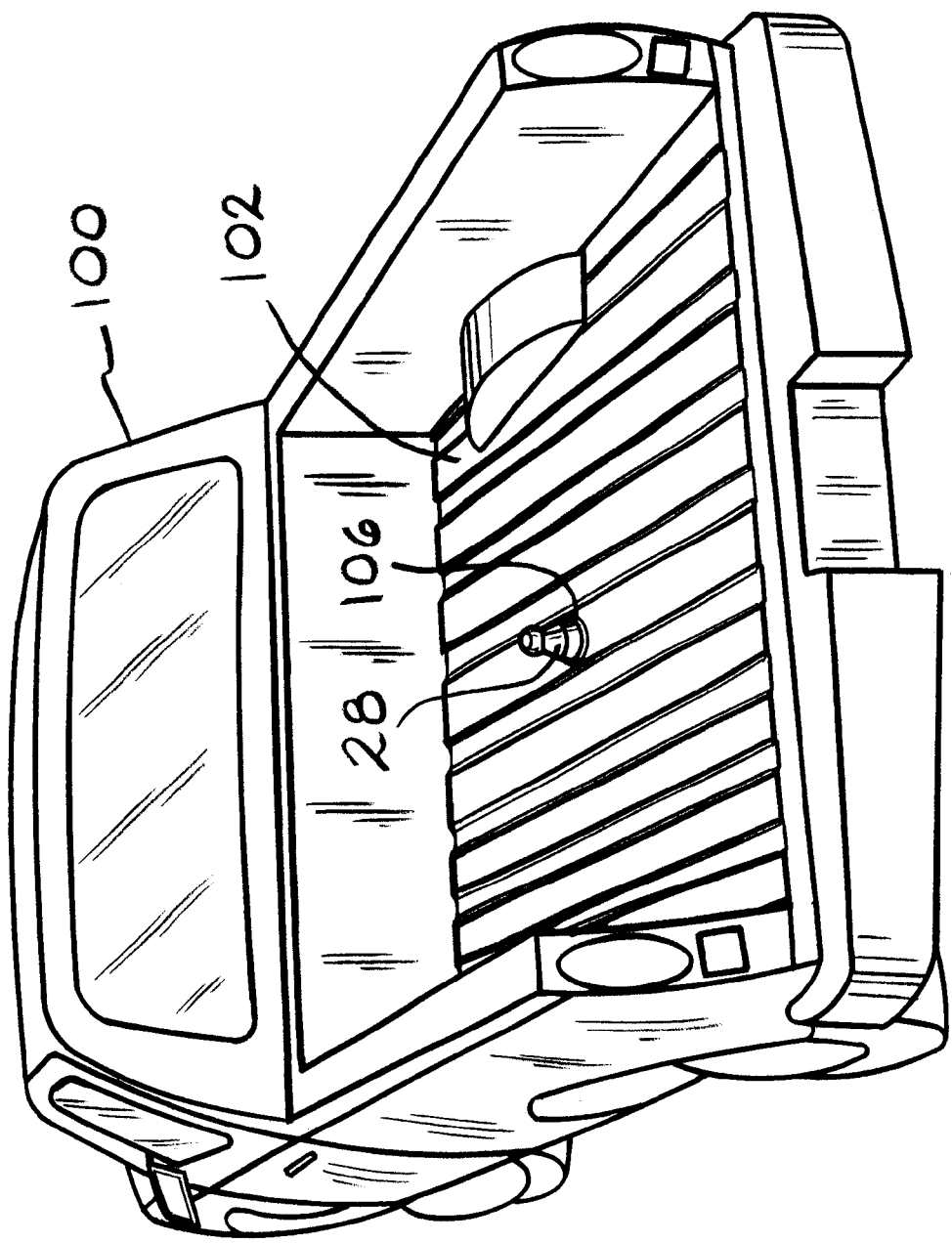
FIG. 2 is a perspective view of the bed 102 of the truck 100 showing the hitch ball 28 in the extended position.
Figure 3:
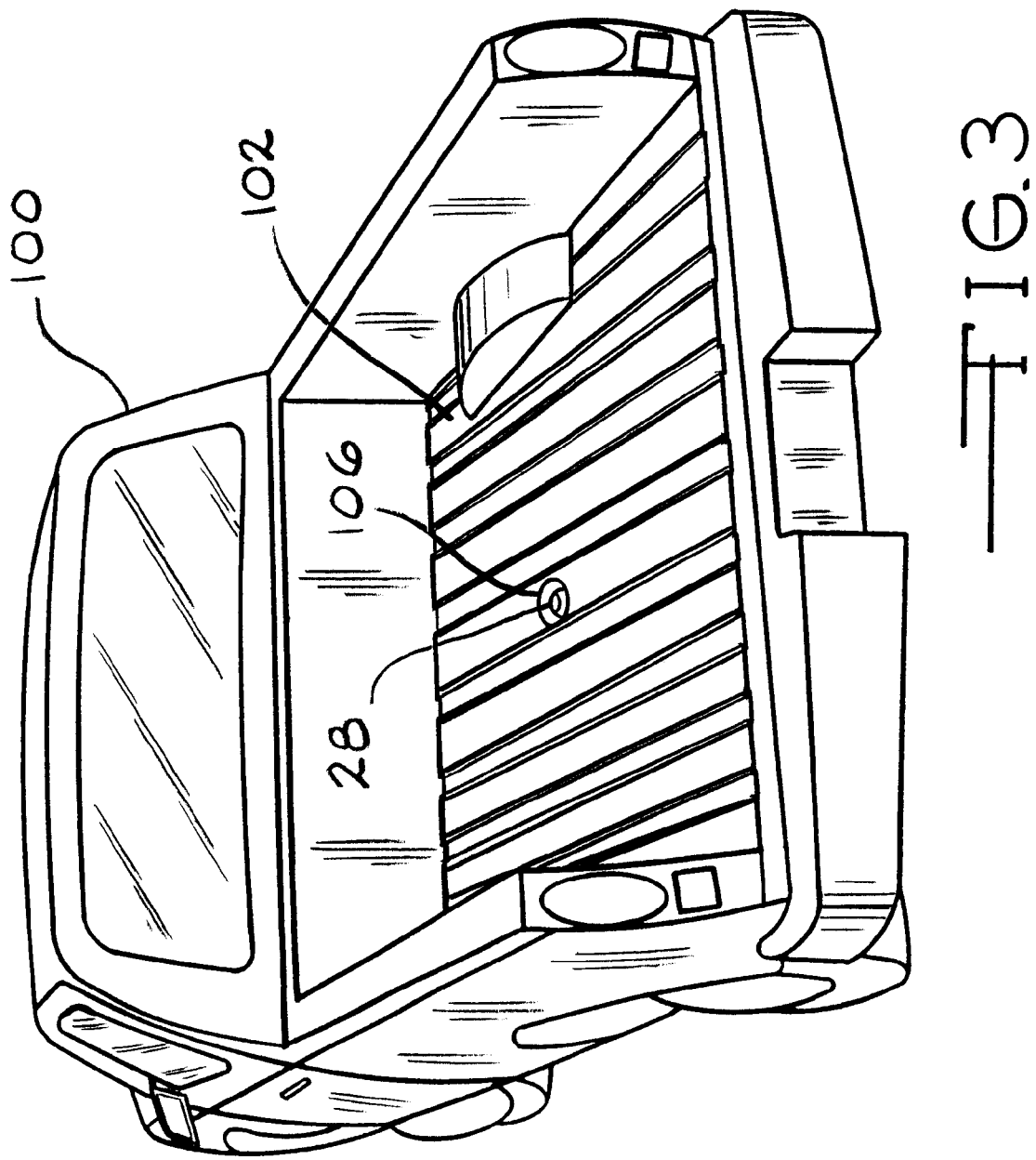
FIG. 3 is a perspective view of the bed 102 of the truck 100 showing the hitch ball 28 in the retracted position.

The hitch assembly 10 of the present invention is intended to be mounted to the frame 104 of a towing vehicle. The vehicle is preferably a pickup truck 100. However, it is understood that the hitch assembly 10 can be used with other towing vehicles having a flat surface similar to a bed of a pickup truck 100. The hitch assembly 10 is preferably mounted adjacent to the underneath surface 102A of the bed 102 of the pickup truck 100. The bed 102 of the truck 100 is preferably corrugated so as to have alternating hills 102B and valleys 102C. The bed 102 of the pickup truck 100 is provided with an opening 106 through which the hitch ball 28 of the hitch assembly 10 extends (FIGS. 2 and 3). In one (1) embodiment, the opening 106 is located in a hill 102B of the bed 102 of the truck 100. However, preferably the opening 106 is spaced equally between the sides of the truck 100 regardless of whether the opening 106 is in a hill 102B or valley 102C or partially in both. The hitch assembly 10 enables a standard pickup truck 100 to be used to pull a vehicle having a gooseneck coupling and to be easily transformed back to a standard pickup truck when not being used as a towing vehicle.

Figure 1:
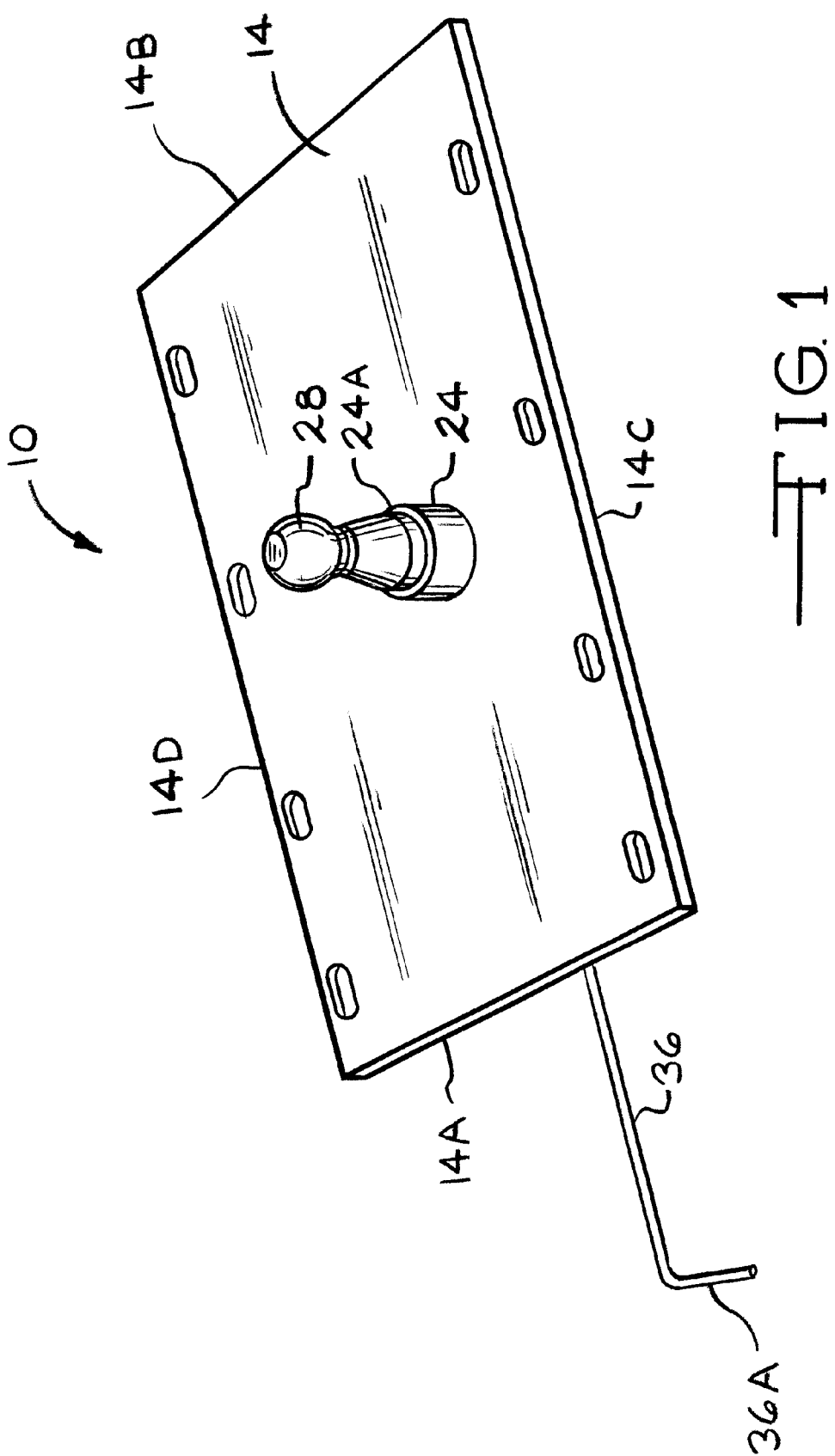
FIG. 1 is a perspective view of the hitch assembly 10 showing the center mounting plate 14, the retractable hitch ball 28 and the first handle end 36A of the locking rod 36.
Figure 9:
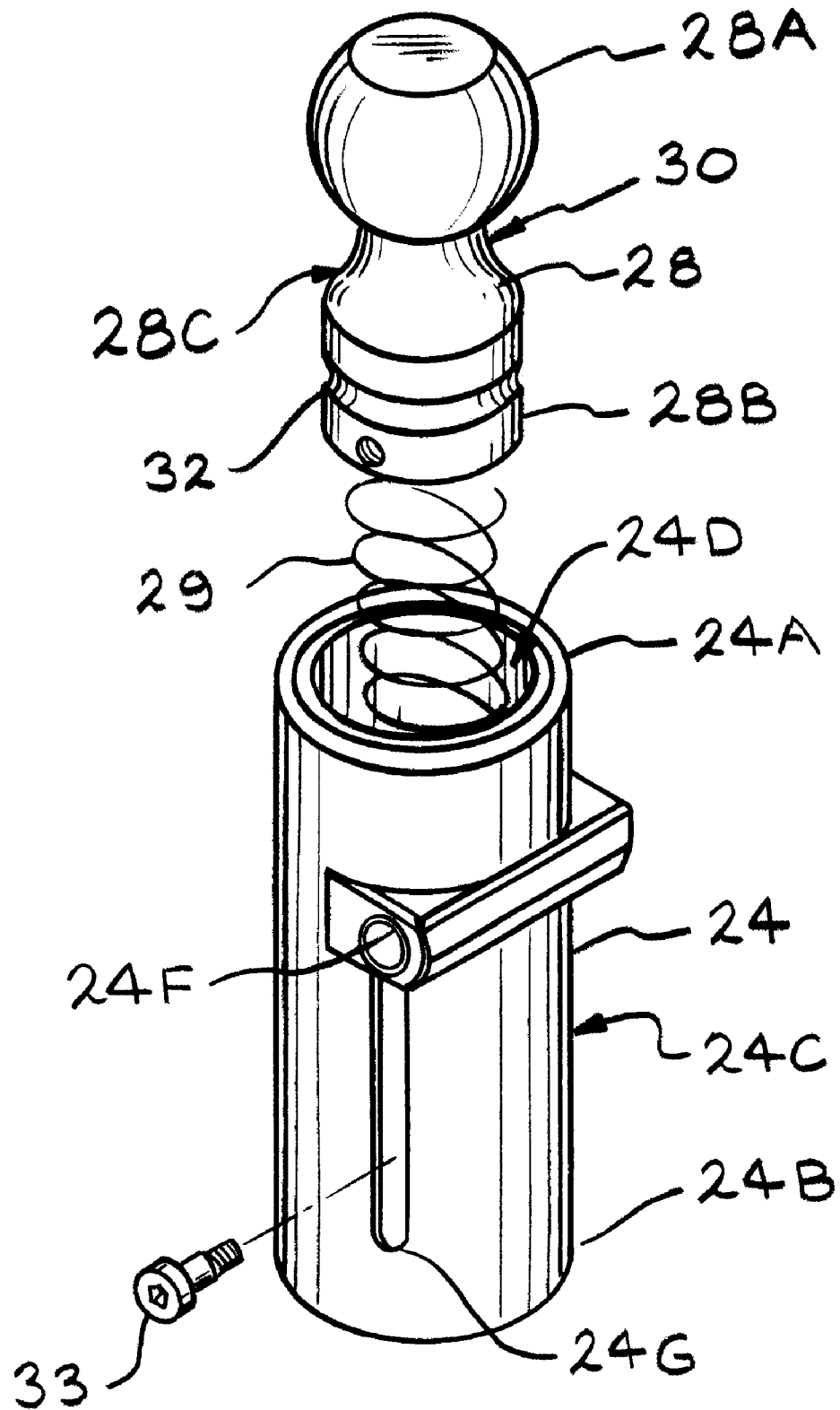
FIG. 9 is a perspective, exploded view of the container 24, hitch ball 28 and spring 29 showing the stop pin 33 and slot 24G.

The hitch assembly 10 includes a center mounting plate 14, a container 24, a hitch ball 28, a mounting assembly and a locking mechanism 34 (FIG. 1). The center mounting plate 14 has a rectangular shape with opposed ends 14A and 14B and sides 14C and 14D and an opening 14E. The opening 14E is preferably spaced evenly between the ends 14A and 14B of the center mounting plate 14. However, in the preferred embodiment, the opening 14E is spaced closer to the first side 14C of the center mounting plate 14. The container 24 is mounted in the opening 14E. The container 24 preferably has a cylindrical shape with an open, upper end 24A and a closed, lower end 24B with a sidewall 24C extending therebetween forming an inner chamber 24D along a longitudinal axis A—A of the container 24. The closed, lower end 24B preferably includes a drain hole 24E to prevent the container 24 from filling with liquid. The container 24 is mounted in the opening 14E such that an upper portion adjacent the open, upper end 24A extends above the center mounting plate 14 and a lower portion, adjacent the closed, lower end 24B, extends below the center mounting plate 14. The upper portion preferably has a height substantially equal to the height of the hills 102B of the bed 102 of the truck 100 such that when the hitch assembly 10 is mounted adjacent the bed 102 of the truck 100, the upper portion of the container 24 extends through the opening 14E in the bed 102 of the truck 100 with the upper end 24A of the container 24 flush with the upper surface of the bed 102 of the truck 100 adjacent the opening 106 (FIGS. 4 to 7). The lower portion has a hole 24F to allow the locking rod 36 of the locking mechanism 34 to extend into the inner chamber 24D of the container 24. A guide can be provided adjacent the hole or holes to support and guide the locking rod 36 into the container (FIG. 9). In the preferred embodiment, the lower portion of the container 24 has a pair of aligned holes 24E (one shown) such that the locking rod 36 can extend completely through the container 24 (FIG. 4). The sidewall 24C of the container 24 has a slot 24G extending parallel to the longitudinal axis A—A of the container 24. The slot 24G accommodates a stop pin 33 (FIG. 9). Side braces or gussets 26 are preferably provided between the container 24 and the center mounting plate 14 to secure the container 24 to the center mounting plate 14 and to prevent the container 24 from pivoting side to side in the opening 14E of the center mounting plate 14 (FIGS. 4 to 7). In the preferred embodiment, the container 24 is stabilized by three (3) large gussets 26 (two shown) and one small gusset (not shown).

The hitch ball 28 preferably has an essentially, cylindrical shape with a first, ball end 28A and a second end 28B with a body portion 28C extending therebetween. The hitch ball 28 is positioned in the inner chamber 24D of the container 24 such that the hitch ball 28 is essentially coaxial with the container 2 and the second end 28B of the hitch ball 28 is adjacent the closed, lower end 24B of the container 24. A spring 29, preferably a conical compression spring, is positioned in the inner chamber 24D of the container 24 between the second end 28B of the hitch ball 28 and the closed, lower end 24B of the container 24. The outer diameter of the body portion 28C of the hitch ball 28 is preferably slightly less than the diameter of the inner chamber 24D of the container 24 such that the hitch ball 28 easily slides within the container 24. The container 24 has a length greater than the length of the hitch ball 28. It is understood that the size of the container 24 can be varied to accommodate hitch balls 28 having a variety of different sizes. In the preferred embodiment, a lubricant is provided in the inner chamber 24D of the container 24 to facilitate movement of the hitch ball 28 up and down in the container 24. The body portion 28C of the hitch ball 28 has a concentric indention or groove 30 adjacent the first ball end 28A to form the ball of the hitch ball 28. The body portion 28C of the hitch ball 28 also preferably has a concentric notch or groove 32 around its circumference adjacent the second end 28B. In an alternate embodiment, the body portion 228C of the hitch ball 228 has a locking bore 232 extending through the body portion 228C adjacent the second end 228B (FIG. 7). A stop pin 33 extends through the slot 24G in the sidewall 24C of the container 24 and is removably mounted in the body portion 28C of the hitch ball 28. The hitch ball 28 is preferably constructed of steel. However, it can be constructed of any high strength, durable material sufficient to meet the required load ratings. The container 24 together with its three (3) large gussets 26 and one (1) small gusset is preferably a weldable, ductile iron casting. Although, alternatively a welded steel fabrication is acceptable.

Figure 8:
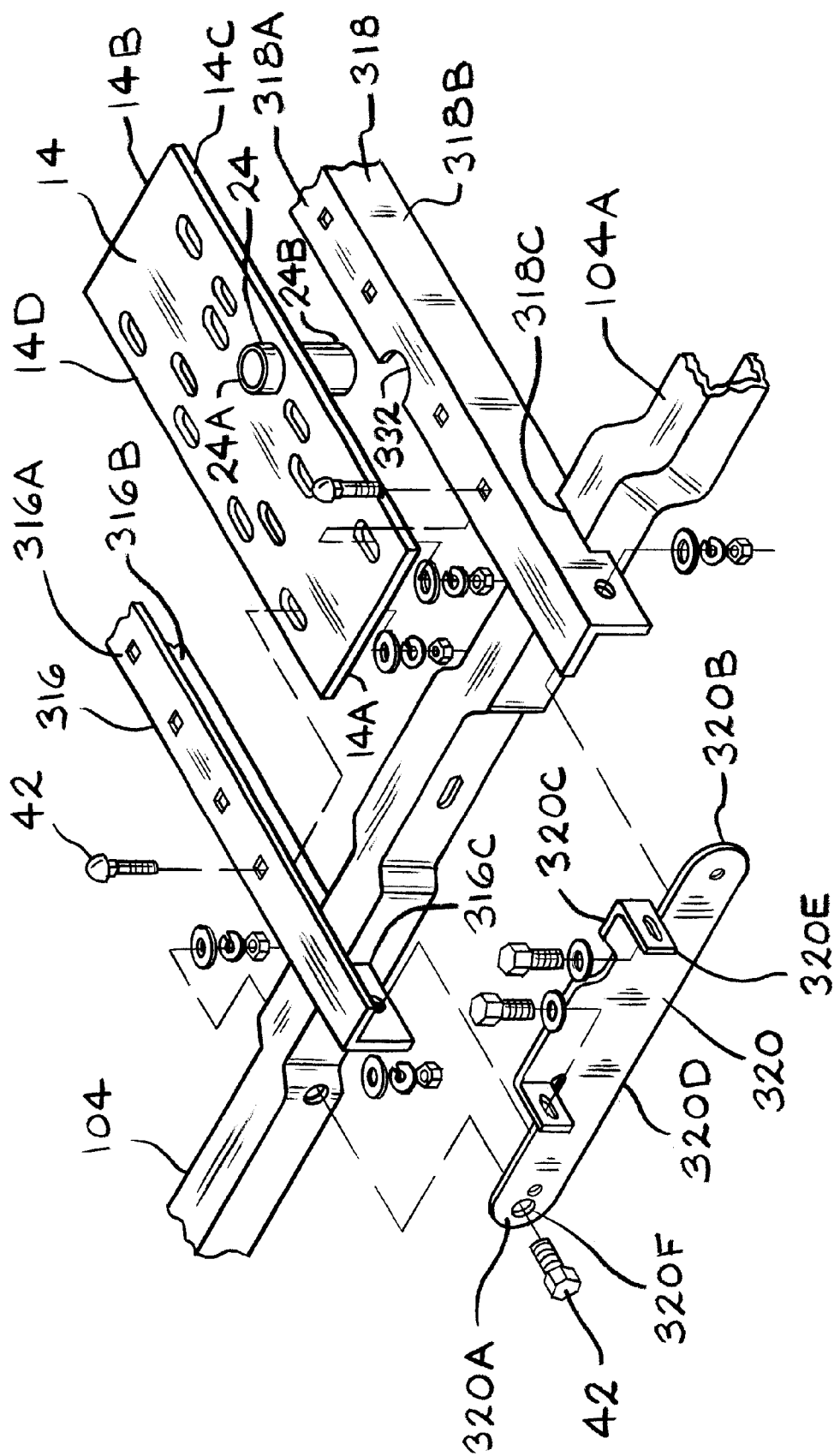
FIG. 8 is an exploded view of an alternate embodiment of the mounting assembly of the hitch assembly 10.

The mounting assembly includes side brackets 16 (one shown) or 316 and 318 and end brackets 20 and 22 or 320 (one shown). The side brackets 16 or 316 and 318 are mounted on and extend along the sides 14C and 14D, respectively of the center mounting plate 14. The first side bracket 16 or 316 preferably has a notch 32 or 332 to accommodate the upper portion of the container 24. The end brackets 20 and 22 or 320 extend along the ends 14A and 14B, respectively of the center mounting plate 14. In the preferred embodiment, the first side bracket 16 or 316 has a greater length than the second side bracket 318. The side brackets 16 or 316 and 318 are preferably angle brackets having first legs 16A or 316A and 318A and second legs 16B or 316B and 318B. The side brackets 16 or 316 and 318 are mounted on the center mounting plate 14 such that the first legs 16A or 316A and 318A are adjacent the top surface of the center mounting plate 14 and the second legs 16B or 316B and 318B extend downward away from the center mounting plate 14 and away from the underneath surface 102A of the bed 102 of the truck 100 when the mounting assembly is mounted to the frame 104 of the truck 100. The mounting assembly 10 of the first embodiment enables the hitch assembly 10 to be mounted on a CHEVROLET pickup truck (FIGS. 4 to 7). The mounting assembly of the second embodiment enables the hitch assembly 10 to be mounted on a DODGE pickup truck. In the first and second embodiments, the end brackets 20 and 22 are preferably angle brackets having first legs 20A and 22A and second legs 20B and 22B. The end brackets 20 and 22 are mounted on the center mounting plate 14 such that the first legs 20A and 22A are adjacent the top surface of the center mounting plate 14 and the second legs 20B and 22B extend downward away from the center mounting plate 14 and away from the underneath surface 102A of the bed 102 of the truck 100 when the mounting assembly is mounted to the frame 104 of the truck 100. The end brackets 20 and 22 are preferably mounted under the side brackets 16 such that the end brackets 20 and 22 are spaced between the top surface of the center mounting plate 14 and the side brackets 16. In the first and second embodiments, the second legs 20B and 22B of the end brackets 20 and 22 are shaped to allow for mounting the hitch assembly 10 to the side rails 104A of the frame 104 of the vehicle 100. The mounting assembly of the third embodiment enables the hitch assembly 10 to be mounted on a FORD pickup truck (FIG. 8). The side brackets 316 and 318 are similar to the side brackets 16 of the first embodiment except that the second legs 316B and 318B of the side brackets 316 and 318 have a notch 316C and 318C adjacent each end which accommodates the side rails 104A of the frame 104 of the truck 100. The end brackets 320 have an essentially rectangular shape with opposed ends 320A and 320B and opposed sides 320C and 320D. Mounting tabs 320E extend outward from the top side 320C and allow for mounting the end brackets 320 to the second legs 316B and 318B of the side brackets 316 and 318. One (1) of the ends 320A of the end brackets 320 has a hole 320F for allowing the end brackets 320 to be secured to the side rails 104A of the frame 104, preferably by carriage bolts 42. In all the embodiments, the hitch assembly 10 is preferably positioned such that the hitch ball 28 is located about 5.0 inches (12.7 cm) in front of the rear axle (not shown) of the truck 100 toward the front end of the truck 100. In the preferred embodiment, the mounting assembly is constructed of steel. The center mounting plate 14, side brackets 16, 316 and 318 and end brackets 20, 320 and 22 are preferably removably fastened together by any well known fastening means such as carriage bolts 42.

The locking mechanism 34 includes a locking rod 36, a stop bracket 38 and a compression spring 40 (FIGS. 4 to 7). The locking rod 36 is slidably mounted between one (1) of the end brackets 20 or 22 or 320 of the mounting assembly and the container 24. The locking rod 36 extends through an opening in the end bracket 20 or 22, through a stop bracket 38 and through the hole 24E in the container 24 to the inner chamber 24D. The first handle end 36A of the locking rod 36 extends outward through the opening in the end bracket 20 or 22 or 320 in a direction opposite the container 24. The first handle end 36A preferably includes an L-shaped portion which acts as a handle and allows for moving the locking rod 36. In an alternate embodiment (not shown), the first handle end 36A of the locking rod 36 is removable. The second end 36B of the locking rod 36 extends through the hole 24E in the container 24 into the inner chamber 24D, perpendicular to the longitudinal axis A—A of the container 24. The stop bracket 38 is mounted to the bottom side of the center mounting plate 14 between the end brackets 20 or 22 or 320 and the container 24. A compression spring 40 is mounted around the locking rod 36 between the container 24 and the stop bracket 38 with the first end 40A of the compression spring 40 adjacent the stop bracket 38. The second end 40B of the compression spring 40 is preferably fixably mounted to the locking rod 36 such that the compression spring 40 is unable to move along the locking rod 36.

The hitch assembly 10 is removably mounted to the side members or rails 104A of the frame 104 of the truck 100. The hitch assembly 10 is mounted to the frame 104 of the truck 100 to ensure that the hitch assembly 10 is able to be used to tow a vehicle such as a trailer. In the first and second embodiments, the center mounting plate 14 and the first legs 20A and 22A of the end brackets 20 and 22 and the first legs 16A of the side brackets 16 are spaced between the bed 102 of the truck 100 and the side rails 104A of the frame 104 of the truck 100. The second legs 20B and 22B of the end brackets 20 and 22 preferably extend downward along the outside of the side rails 104A. In the third embodiment, end brackets 320 are spaced between the second legs 316B and 318B of the side brackets 316 and 318 but do not extend over the top of the side rails 104A of the frame 104 of the vehicle 100. The second legs 20B, 320B and 22B of the end brackets 20, 320 and 22 are preferably mounted by fasteners 42 to the side rails 104A of the frame 104 of the truck 100. In all the embodiments, the end brackets 20, 320 and 22 are preferably fastened to the side rails 104A of the frame 104 of the truck 100 with the mounting assembly extending between the sides of the truck 100 essentially parallel to the front and rear end of the truck 100. In the preferred embodiment, the locking rod 36 is positioned such that when the hitch assembly 10 is mounted on the truck 100, the first handle end 36A of the locking rod 36 is in the wheel well of the pickup truck 100. In the alternate embodiment where the first handle end 36A is removable, when the first handle end 36A is removed, preferably only a small attachment section extends into the wheel well of the pickup truck 100. In the preferred embodiment, the mounting holes in the second legs 20B, 320B and 22B of the end brackets 20, 320 and 22 are preferably located such that the hitch assembly 10 can be mounted to the frame 104 of the truck 100 using existing holes in the frame 104. The hitch assembly 10 is mounted on the underneath surface 102C of the bed 102 such that the upper portion of the container 24 extends through the opening 106 in the bed 102 of the truck 100. In the preferred embodiment, the open, upper end 24A of the container 24 is flush with the top surface 102A of the bed 102 such that when the hitch ball 28 is fully retracted, the container 24 does not interfere with the normal operation of the bed 102 of the truck 100.

When not in use, the hitch ball 28 is preferably located in the fully retracted position with the compression spring 40 compressed between the second end 28B of the hitch ball 28 and the closed, second end 24B of the container 24 (FIG. 6). In the fully retracted position, the hitch ball 28 is completely within the container 24 such that the first ball end 28A of the hitch ball 28 does not extend beyond the open, upper end 24A of the container 24. Optionally, a cap (not shown) is placed over the open, upper end 24A of the container 24 when the hitch ball 28 is in the fully retracted position. In the preferred embodiment, the top of the first ball end 28A of the hitch ball 28 is substantially flush with the top surface 102A of the bed 102 of the truck 100 when the hitch ball 28 is in the fully retracted position. The hitch ball 28 is locked in the fully retracted position by the locking rod 36. In the locked, retracted position, the second end 36B of the locking rod 36 extends through the hole 24E in the container 24, into the inner chamber 24D and the indention 30 in the hitch ball 28 adjacent the first ball end 28A of the hitch ball 28 (FIG. 6). The positioning of the second end 36B of the locking rod 36 in the indention 30 prevents the hitch ball 28 from moving upward.

To move the hitch ball 28 into the fully extended position, the cap if present, is removed from the upper open end 24A of the container 24 and the locking rod 36 is moved out of the locked position. The locking rod 36 is moved to the unlocked position by grasping the first handle end 36A and applying a force in a direction opposite the container 24 such that the second end 36B of the locking rod 36 is moved out of the inner chamber 24D of the container 24. In the preferred embodiment, the locking rod 36 is pulled out such a distance that the second end 36B of the locking rod 36 is not removed from the hole 24E or guide in the container 24. When the second end 36B of the locking rod 36 is removed from the inner chamber 24D, the force of the compression spring 29 pushing upward on the second end 28B of the hitch ball 28, moves the hitch ball 28 into the semi-retracted or semi-extended position (FIG. 5). As the hitch ball 28 moves upward, the first handle end 36A of the locking rod 36 is released. The compression spring 40 on the locking rod 36 moves the locking rod 36 toward the container 24 and towards the locked position. However, in the semi-retracted position, the body portion 28C of the hitch ball 28 is adjacent the hole 24E in the container 24 and blocks the hole 24E, preventing the second end 36B of the locking rod 36 from entering the inner chamber 24D. In the semi-retracted position, the first ball end 28A of the hitch ball 28 extends beyond the open first end 24A of the container 24 and beyond the top surface 102A of the bed 102 of the truck 100 such that a user can grab the first ball end 28A of the hitch ball 28 and pull the hitch ball 28 into the fully extended position.

As the hitch ball 28 moves toward the fully extended position, the concentric notch 32 moves toward the holes 24E in the container 24. As the hitch ball 28 is moved upward, the stop pin 33 moves along the slot 24G in the container 24. When the hitch ball 28 reaches the fully extended position, the stop pin 33 is at the top end of the slot 24G and prevents the hitch ball 28 from being moved upward beyond the fully extended position. The stop pin 33 prevents the second end 28B of the hitch ball 28 from moving above the locking rod 36 and prevents the hitch ball 28 from being pinned by the locking rod 36 in a position above the locking rod 36. The stop pin 33 also prevents the hitch ball 28 from being removed from the container 24 (FIG. 9). In the preferred embodiment, when the hitch ball 28 is in the fully extended position, the concentric notch 32 is adjacent the holes 24E and the second end 36B of the locking rod 36 extends through the first hole 24E and into the inner chamber 24D of the container 24 and through the concentric notch 32 to the second hole 24F in the opposite side of the container 24 and locks the hitch ball 28 in the fully extended position (FIG. 4). In the alternate embodiment when the hitch ball 228 is in the fully extended position and the locking bore 232 is aligned with the first hole 24E in the container 24, the first end 36A of the locking rod 36 extends through the first hole 24E and into the locking bore 232 and locks the hitch ball 228 in the extended position (FIG. 7). To move the hitch ball 28 from the fully extended position to the fully retracted position, the locking rod 36 is moved into the unlocked position by applying a force to the first handle end 36A of the locking rod 36 in a direction opposite the container 24. As the second end 36B of the locking rod 36 moves out of the inner chamber 24D of the container 24, the hitch ball 28 moves downward into the chamber 24D due to the weight of the hitch ball 28 pushing down on the compression spring 29. The user then applies a downward force on the hitch ball 28 which moves the hitch ball 28 into the fully retracted position. In the preferred embodiment, the force of the compression spring 29 is such that the compression spring 29 prevents the hitch ball 28 from moving to the fully retracted position without assistance and keeps the hitch ball 28 in the semi-retracted position. The use of the compression spring 29 having a force such as to keep or move the hitch ball 28 into a semi-retracted position allows a single user to move the hitch ball 28 from the fully retracted position to the fully extended position and vice versa. The compression spring 40 on the locking rod 36 automatically moves the locking rod 36 from the unlocked position to the locked position as the hitch ball 28 is moved from the semi-retracted to the fully retracted position or from the semi-retracted to the fully extended position.

It is intended that the foregoing description be only illustrative of the present invention and that the present invention be limited only by the hereinafter appended claims.

I claim:

1. A trailer hitch assembly for a bed of a truck adjacent an opening in the bed of the truck, which comprises:
    (a) a container having a first end and a closed, second end with a sidewall extending therebetween forming an inner chamber, the sidewall having an opening extending into the inner chamber wherein the container is mounted adjacent an underneath surface of the bed of the truck such that the first end of the container is adjacent the opening in the bed of the truck;
    (b) a hitch ball mounted in the inner chamber of the container having a first ball end and a second end;
    (c) a biasing means mounted in the inner chamber of the container between the closed, second end of the container and the second end of the hitch ball for biasing the hitch ball toward the open first end of the container; and
    (d) a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position.

2. The assembly of claim 1 wherein the biasing means is a conical compression spring.

3. The assembly of claim 1 wherein the hitch ball has a substantially cylindrical shape with a first concentric groove adjacent the first end and a second concentric groove adjacent the second end wherein in a first locked position the first end of the locking rod extends into the first groove to lock the hitch ball in the extended position and wherein in a second locked position the first end of the locking rod extends into the second groove to lock the hitch ball in the retracted position.

4. The assembly of claim 3 wherein the biasing means is of a strength such that when the hitch ball is in the locked, extended position and the locking rod is moved to an unlocked position, the hitch ball moves to a semi-extended position such that the first end of the locking rod is spaced between the first and second grooves in the hitch ball.

5. The assembly of claim 3 wherein the biasing means is of a strength such that when the hitch ball is locked in the retracted position and the locking rod is moved to the unlocked position, the hitch ball moves to a semi-retracted position such that the first end of the locking rod is spaced between the first and second grooves in the hitch ball.

6. The assembly of claim 5 wherein in the semi-retracted position, the first ball end of the hitch ball extends above the bed of the truck.

7. The assembly of claim 1 wherein the locking rod is of a length such that the second end of the locking rod extends into a rear, wheel well of the truck.

8. The assembly of claim 1 wherein the locking rod has a biasing means and wherein to move the locking rod to an unlocked position, a force is applied to the second end of the locking rod in a direction away from the container and wherein the biasing means moves the locking rod toward the locked position when the force is removed from the second end.

9. The assembly of claim 1 wherein the container is mounted such that the open first end of the container is flush with a top surface of the bed of the truck.

10. The assembly of claim 1 wherein the second end of the locking rod forms a handle for moving the locking rod to an unlocked position.

11. The assembly of claim 1 wherein the hitch ball has a first bore and wherein in the locked, extended position, the first end of the locking rod extends into the first bore.

12. The assembly of claim 1 wherein a slot is provided in the sidewall of the container and extends parallel to a longitudinal axis of the container and wherein a stop pin extends through the slot and is removably mounted in the hitch ball and prevents the second end of the hitch ball from being moved beyond the locking rod toward the first end of the container.

13. A trailer hitch assembly for mounting on an underneath surface of a bed of a truck adjacent an opening in the bed of the truck, which comprises:

(a) a mounting plate for mounting adjacent the underneath surface of the bed of the truck, the plate having an opening wherein when the mounting plate is mounted adjacent the underneath surface of the bed, the opening of the mounting plate is adjacent the opening in the bed of the truck;

(b) a container mounted in the opening of the mounting plate and having a first end and a closed, second end with a sidewall extending therebetween forming an inner chamber, the sidewall having an opening extending into the inner chamber wherein the container is mounted such that the first end of the container is adjacent the opening in the bed of the truck;

(c) a hitch ball mounted in the inner chamber of the container having a first ball end and a second end;

(d) a biasing means mounted in the inner chamber of the container between the closed, second end of the container and the second end of the hitch ball for biasing the hitch ball toward the open first end of the container; and (e) a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position.

14. The assembly of claim 13 wherein the biasing means is a conical compression spring.

15. The assembly of claim 13 wherein the hitch ball has a substantially cylindrical shape with a first concentric groove adjacent the first end and a second concentric groove adjacent the second end wherein in a first locked position the first end of the locking rod extends into the first groove to lock the hitch ball in the extended position and wherein in a second locked position, the first end of the locking rod extends into the second groove to lock the hitch ball in the retracted position.

16. The assembly of claim 15 wherein the biasing means is of a strength such that when the hitch ball is locked in the extended position and the locking rod is moved to an unlocked position, the hitch ball moves to a semi-extended position such that the first end of the locking rod is spaced between the first and second grooves in the hitch ball.

17. The assembly of claim 15 wherein the biasing means is of a strength such that when the hitch ball is locked in the retracted position and the locking rod is moved to the unlocked position, the hitch ball moves to a semi-retracted position such that the first end of the locking rod is spaced between the first and second grooves in the hitch ball.

18. The assembly of claim 17 wherein in the semi-retracted position, the first ball end of the hitch ball extends above the bed of the truck.

19. The assembly of claim 13 wherein the locking rod is of a length such that the second end of the locking rod extends into a rear, wheel well of the truck.

20. The assembly of claim 13 wherein the locking rod has a biasing means and wherein to move the locking rod to an unlocked position, a force is applied to the second end of the locking rod in a direction away from the container and wherein the biasing means moves the locking rod toward the locked position when the force is removed from the second end.

21. The assembly of claim 13 wherein the container is mounted such that the open first end of the container is flush with a top surface of the bed of the truck.

22. The assembly of claim 13 wherein the second end of the locking rod forms a handle for moving the locking rod to an unlocked position.

23. The assembly of claim 13 wherein the hitch ball has a first bore and wherein in the locked, extended position, the first end of the locking rod extends into the first locking bore.

24. The assembly of claim 13 wherein the mounting plate has brackets which are configured to be mounted on a frame of the truck.

25. A method for providing a retractable hitch ball in a bed of a truck, which comprises:

(a) mounting a hitch ball assembly to an underneath side of the bed of the truck adjacent an opening in the bed of the-truck, the hitch ball assembly including: a container having a first end and a closed second end with a sidewall extending therebetween forming an inner chamber, the sidewall having an opening extending into the inner chamber wherein the container is mounted adjacent the underneath surface of the bed of the truck such that the first end of the container is adjacent the opening in the bed of the truck; a hitch ball mounted in the inner chamber of the container having a first ball end and a second end; a biasing means mounted in the inner chamber of the container between the closed, second end of the container and the second end of the hitch ball for biasing the hitch ball toward the open first end of the container; and a locking rod having a first end and a second end and mounted adjacent the container such that in a locked position, the first end of the locking rod extends through the opening in the sidewall of the container and into contact with the hitch ball and wherein the locking rod is capable of locking the hitch ball in an extended position or a retracted position;

(b) positioning the hitch ball in a locked, retracted position such that the first end of the hitch ball does not extend beyond the first end of the container in a direction opposite the second end of the container and the locking rod is in the locked position such that the first end of the locking rod is in contact with the hitch ball;

(c) moving the locking rod into the unlocked position by applying a force to the second end of the locking rod in a direction opposite the first end of the locking rod wherein when the locking rod moves out of contact with the hitch ball, the biasing means moves the hitch ball into a semi-extended position;

(d) releasing the locking rod; and (e) applying a force to the hitch ball in a direction away from the second end of the container such that the hitch ball moves into the fully extended position wherein as the hitch ball moves into the fully extended position, the first end of the locking rod moves into a locked position to lock the hitch ball in the fully extended position.

26. The method of claim 25 wherein the hitch ball is retracted by applying a force on the second end of the locking rod in a direction opposite the first end such that the first end of the locking rod is moved out of contact with the hitch ball wherein the biasing means moves the hitch ball to a semi-retracted position and applying a force on the hitch ball in a direction towards the second end of the container which moves the hitch ball into a fully retracted position wherein the locking rod moves into the locked position to lock the hitch ball in the fully retracted position.

27. The method of claim 25 wherein a stop pin extends through the container and is removably inserted into the hitch ball and in step (e), a force is applied to the hitch ball until the stop pin prevents further movement and the hitch ball is in the fully extended position.

* * * * *